United States Patent
Whelan et al.

(10) Patent No.: US 8,104,245 B2
(45) Date of Patent: Jan. 31, 2012

(54) METHOD FOR WATERPROOFING A STRUCTURAL SURFACE

(75) Inventors: Brian J. Whelan, Canton, MA (US); Gary W. Whittemore, E. Walpole, MA (US); Dan Ben-Daat, Sharon, MA (US); Jon M. Jensen, Sharon, MA (US)

(73) Assignee: SIKA Technology AG, Zörich (CH)

( * ) Notice: Subject to any disclaimer, the term of this patent is extended or adjusted under 35 U.S.C. 154(b) by 0 days.

(21) Appl. No.: 12/317,615

(22) Filed: Dec. 24, 2008

(65) Prior Publication Data

US 2009/0113841 A1    May 7, 2009

Related U.S. Application Data

(62) Division of application No. 11/983,995, filed on Nov. 13, 2007, which is a division of application No. 11/881,245, filed on Jul. 26, 2007.

(60) Provisional application No. 60/856,155, filed on Nov. 2, 2006, provisional application No. 60/934,785, filed on Jun. 15, 2007.

(51) Int. Cl.
*E04B 5/00* (2006.01)
*E04C 1/00* (2006.01)
*B32B 7/12* (2006.01)

(52) U.S. Cl. ........ 52/741.4; 52/409; 52/309.9; 428/351; 428/354

(58) Field of Classification Search ............. 52/408, 52/409, 746.11, 746.1, 403.1, 741.4, 741.41, 52/309.9; 428/351, 354
See application file for complete search history.

(56) References Cited

U.S. PATENT DOCUMENTS

| | | | | |
|---|---|---|---|---|
| 1,991,007 A | * | 2/1935 | Bonney et al. | 524/2 |
| 3,093,935 A | * | 6/1963 | Dunn | 52/309.8 |
| 3,552,994 A | * | 1/1971 | Dipner | 442/45 |
| 3,646,180 A | * | 2/1972 | Winnick | 264/45.3 |
| 3,672,951 A | | 6/1972 | Moore et al. | |
| 3,741,856 A | * | 6/1973 | Hurst | 442/150 |
| 4,019,296 A | * | 4/1977 | Jochmann | 52/268 |
| 4,024,679 A | | 5/1977 | Rain et al. | |
| 4,067,164 A | | 1/1978 | McMillan | |
| 4,141,187 A | | 2/1979 | Graves | |
| 4,169,184 A | * | 9/1979 | Pufahl | 428/337 |
| 4,239,795 A | * | 12/1980 | Haage et al. | 428/60 |
| 4,535,015 A | * | 8/1985 | Bruner et al. | 428/44 |
| 4,535,581 A | | 8/1985 | Fujiki et al. | |
| 4,588,637 A | | 5/1986 | Chiu | |
| 4,589,804 A | | 5/1986 | Paeglis et al. | |
| 4,658,554 A | | 4/1987 | Riley et al. | |
| 4,668,315 A | * | 5/1987 | Brady et al. | 156/71 |
| 4,669,246 A | | 6/1987 | Freeman | |

(Continued)

FOREIGN PATENT DOCUMENTS

JP        07-292335 A        7/1995

(Continued)

*Primary Examiner* — Robert Canfield
*Assistant Examiner* — Brent W Herring
(74) *Attorney, Agent, or Firm* — Pandiscio & Pandiscio

(57) ABSTRACT

A roof/wall structure includes a substantially rigid substrate and a waterproof membrane adhesively joined to an outer surface of the substrate. The membrane includes a layer of thermoplastic or elastomeric waterproof material, a layer of cushion material bound to an inner surface of the layer of waterproof material, and a pressure sensitive adhesive bound to a side of the layer of cushion material remote from the layer of waterproof material and bound to the substrate.

15 Claims, 1 Drawing Sheet

U.S. PATENT DOCUMENTS

| | | | |
|---|---|---|---|
| 4,735,838 A | 4/1988 | Roberts et al. | |
| 4,757,652 A * | 7/1988 | Kalkanoglu | 52/420 |
| 4,855,172 A | 8/1989 | Chiu | |
| 4,870,796 A | 10/1989 | Hart et al. | |
| 4,977,720 A | 12/1990 | Kuipers | |
| 5,000,379 A | 3/1991 | LaRue | |
| 5,088,259 A | 2/1992 | Myers | |
| 5,095,068 A | 3/1992 | Chiu | |
| 5,145,748 A | 9/1992 | Gaidis et al. | |
| 5,253,461 A | 10/1993 | Janoski et al. | |
| 5,268,228 A * | 12/1993 | Orr | 428/343 |
| 5,546,719 A | 8/1996 | Maiers et al. | |
| 5,766,721 A | 6/1998 | Bussey et al. | |
| 5,866,243 A | 2/1999 | Yasuda et al. | |
| 5,968,630 A * | 10/1999 | Foster | 428/77 |
| 6,122,889 A | 9/2000 | Zeidler | |
| 6,231,962 B1 | 5/2001 | Bries et al. | |
| 6,235,365 B1 | 5/2001 | Schaughency et al. | |
| 6,323,251 B1 * | 11/2001 | Perez et al. | 521/134 |
| 6,418,687 B1 * | 7/2002 | Cox | 52/309.4 |
| 6,543,199 B1 | 4/2003 | Tomlinson et al. | |
| 6,581,348 B2 * | 6/2003 | Hunter, Jr. | 52/408 |
| 6,586,080 B1 * | 7/2003 | Heifetz | 428/198 |
| 6,656,557 B2 * | 12/2003 | Phillips | 428/40.3 |
| 6,679,018 B2 | 1/2004 | Georgeau et al. | |
| 6,691,472 B2 * | 2/2004 | Hubert | 52/169.5 |
| 6,701,685 B2 | 3/2004 | Rippey | |
| 6,766,817 B2 | 7/2004 | da Silva | |
| 6,769,215 B1 * | 8/2004 | Carkner | 52/411 |
| 6,864,194 B2 | 3/2005 | Hindi et al. | |
| 6,864,195 B2 | 3/2005 | Peng | |
| 6,877,288 B2 * | 4/2005 | Shirota | 52/416 |
| 6,918,404 B2 | 7/2005 | daSilva | |
| 7,066,586 B2 | 6/2006 | daSilva | |
| 7,244,398 B2 | 7/2007 | Kotary et al. | |
| 7,285,255 B2 | 10/2007 | Kadlee et al. | |
| 2002/0037405 A1 * | 3/2002 | Naipawer et al. | 428/351 |
| 2002/0095898 A1 | 7/2002 | Bettencourt | |
| 2003/0054127 A1 | 3/2003 | Heifetz | |
| 2003/0127765 A1 * | 7/2003 | Weiland et al. | 264/69 |
| 2003/0196914 A1 * | 10/2003 | Tzou et al. | 206/63.5 |
| 2004/0053036 A1 | 3/2004 | Burillo | |
| 2004/0076786 A1 * | 4/2004 | Naipawer et al. | 428/40.3 |
| 2004/0187432 A1 | 9/2004 | Robison et al. | |
| 2005/0126102 A1 | 6/2005 | Swann | |
| 2005/0221073 A1 * | 10/2005 | Liou | 428/304.4 |
| 2006/0019058 A1 * | 1/2006 | Dickins | 428/95 |
| 2006/0137272 A1 | 6/2006 | Kim | |
| 2006/0174546 A1 | 8/2006 | Kim | |
| 2006/0240252 A1 | 10/2006 | Takahashi et al. | |
| 2006/0254207 A1 * | 11/2006 | Mulligan | 52/794.1 |
| 2006/0263596 A1 | 11/2006 | Bamborough et al. | |
| 2007/0130849 A1 * | 6/2007 | Langer et al. | 52/169.14 |
| 2007/0266660 A1 | 11/2007 | Davies et al. | |
| 2008/0010933 A1 | 1/2008 | Faulkner et al. | |
| 2008/0015531 A1 | 1/2008 | Hird et al. | |
| 2008/0028705 A1 * | 2/2008 | Morse et al. | 52/309.12 |
| 2010/0028650 A1 * | 2/2010 | Kusakawa et al. | 428/314.4 |

FOREIGN PATENT DOCUMENTS

| | | |
|---|---|---|
| JP | 07292335 | 11/1995 |

\* cited by examiner

METHOD FOR WATERPROOFING A STRUCTURAL SURFACE

CROSS REFERENCE TO RELATED APPLICATIONS

This is a division of application Ser. No. 11/983,995, filed Nov. 13, 2007, which is a division of application Ser. No. 11/881,245, filed Jul. 26, 2007, both in the names of Brian J. Whelan, Gary W. Whittemore, Dan Ben-Daat and Jon M. Jensen. This application claims priority from U.S. Provisional Patent Application No. 60/856,155, filed Nov. 2, 2006, and U.S. Provisional Application No. 60/934,785, filed Jun. 15, 2007, both filed in the names of Brian J. Whelan, Gary W. Whittemore, Dan Ben-Daat, and John M. Jensen.

BACKGROUND OF THE INVENTION

1. Field of the Invention

The invention is directed to a self-adhering membrane which may be applied to roof and/or wall structures, particularly "green" roof and plaza deck constructions, including planters, balconies, terraces, foundation walls, tunnel structures, and the like.

2. Description of the Prior Art

It has become increasingly popular to provide new building and other constructions with green roofs, that is, roofs supporting earth, grass, and plantings, often with walk-ways and/or terraces. The roof decks frequently are made of structural concrete or metal decking covered with a rigid hardboard, sometimes metal-covered, and covered with a waterproof thermoplastic membrane applied to the outside surface of the concrete, rigid hardboard, or other substrate. Inasmuch as the membrane is typically of the type customarily used on conventional non-green rooftops, and having a thickness of about 60 or more mils, the membrane must be applied to a very smooth and clean concrete, rigid hardboard, or other rigid surface. Irregularities in the smoothness of the outside surface of the substrate can produce perforations and punctures in the membrane which breach the water-tight integrity of the membrane. The same problem applies to foundation walls, tunnel structures, and the like, of structural concrete or masonry.

In an effort to better absorb and conform to irregularities in the substrate surface, a layer of felt-like material has been used to form a cushion layer of sorts between the substrate surface and the waterproof membrane. However, it has been discovered that while perforations and punctures in the membrane are reduced, any that remain or occur allow-water passing therethrough to flow into the felt-like material which acts like a wick and spreads the water out in directions not easy to determine. Because of lateral migration of the water, a leak in the membrane in a first area may make itself known in remote second areas. Determining the location of the leak into the underlying structure can be extremely difficult, expensive and time-consuming to accomplish, inasmuch as removal of the overburden is required to gain access to a breach in the membrane.

To overcome the above-noted problems, resort has been made to adhered liquid materials, such as hot rubberized asphalt (HRA), a system which, as the name implies, involves the laying down of HRA in the form of a hot liquid, usually of about 150-215 mils thickness. In such procedures, precautions must be taken with respect to workers inhaling fumes, handling hot kettles, and the hot asphalt. The odor and smell of asphalt tends to travel and irritate nearby site workers, building occupants and general public. Further, usually no portion of the area can be used during installation of HRA nor after installation until the HRA cools and solidifies.

Cold-applied liquid products are also used in such applications, best installed in thinner coatings of around 60 mils thickness. Such materials have fewer application issues inasmuch as they are applied at ambient temperatures, but often contain solvents which have odors and repugnant smells, or, when spray-applied, produce air-borne particulates that create a potential hazard for installers, site workers, and building occupants.

Thus, there is a need for an effective, efficient, less expensive, odor and solvent-free, and less hazardous material and method for laying a waterproofing membrane down over a structure that is subject to a wet or moist external environment.

Accordingly, an object of the invention is to provide a waterproofing membrane for application to a surface of a structure to provide waterproofing and moisture protection to the structure, and which does not provide a medium for lateral migration of water therethrough.

A further object of the invention is to provide a method for making a waterproof membrane for application to a surface of a structure.

A further object of the invention is to provide a roof/wall, foundation or tunnel structure providing watertight integrity.

A still further object of the invention is to provide a method for waterproofing a roof and/or a wall, foundation or tunnel structure.

A still further object of the invention is to provide a method for increasing puncture resistance of a thermoplastic or elastomeric membrane for use in water proofing subterranean structures and surfaces.

SUMMARY OF THE INVENTION

With the above and other objects in view, as will hereinafter appear, a feature of the present invention is the provision of a membrane for application to a surface of a structure to provide waterproofing and moisture protection to the structure. The membrane includes an outer surface layer of thermoplastic material, a layer of cushion material laminated to, or fused to, or adhered to, an inner surface of the layer of thermoplastic material, a pressure sensitive adhesive bound to a side of the cushion material remote from the thermoplastic layer, and a release liner removably mounted on the remote side of the pressure sensitive adhesive.

In accordance with a further feature of the invention, there is provided a method for making a waterproof membrane, the method comprising the steps of providing a layer of cushion material, bonding a layer of waterproof thermoplastic material to a first side of the layer of cushion material, affixing a layer of pressure sensitive adhesive to a second side of the layer of cushion material, and mounting a release liner on a side of the pressure sensitive adhesive remote from the cushion material.

In accordance with a further feature of the invention, there is provided a roof/wall, foundation or tunnel structure (hereinafter "roof/wall") comprising a substantially rigid substrate, and a laminar membrane adhesively bonded to an outer surface of the substrate. The membrane comprises an outer surface layer of thermoplastic or elastomeric waterproof material, a layer of cushion material bound to an inner surface of the layer of the waterproof material, and a pressure sensitive adhesive bound to a side of the cushion material remote from the waterproof material layer, and bound to the substrate.

In accordance with a still further feature of the invention, there is provided a method for waterproofing a structural surface. The method comprises the steps of providing a membrane for application to the surface, the membrane comprising an outer surface layer of thermoplastic material, a layer of cushion material laminated to, or fused to, or adhered to an inner surface of the layer of thermoplastic material, a pressure sensitive adhesive bound to a surface of the cushion material remote from the thermoplastic layer, and a release liner removably mounted on the remote side of the pressure sensitive adhesive, removing the release liner to expose the pressure sensitive adhesive, and pressing the pressure sensitive adhesive against the structural surface to conform the layer of cushion material to the structural surface and bind the waterproofing membrane to the structural surface.

In accordance with a still further feature of the invention, there is provided a method for increasing puncture resistance of a thermoplastic membrane for use in water proofing of subterranean structural substrates. The method comprises bonding a layer of cushion material to the thermoplastic membrane, the cushion material comprising a cellular foam material, the cushion material being adapted to conform around minor irregularities in a surface of the structural substrate.

The above and other features of the invention, including various novel details of construction, combinations of parts, and method steps, will now be more particularly described with reference to the accompanying drawings and pointed out in the claims. It will be understood that the particular laminar combinations and methods embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent.

In the drawings:

FIG. 3 is a diagrammatic sectional view illustrative of a selvedge feature of the invention.

DESCRIPTION OF THE PREFERRED EMBODIMENTS

Figure 1:
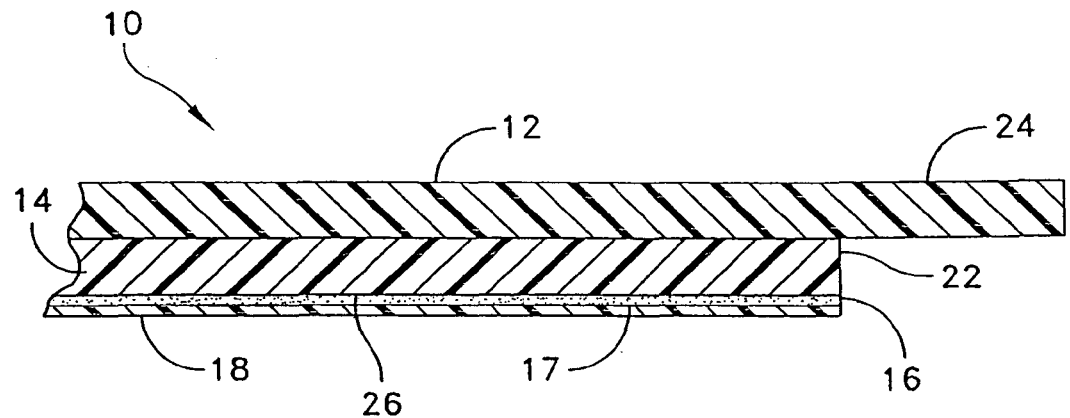
FIG. 1 is a diagrammatic sectional view of one form of a portion of a waterproofing membrane illustrative of an embodiment of the invention.
Figure 2:
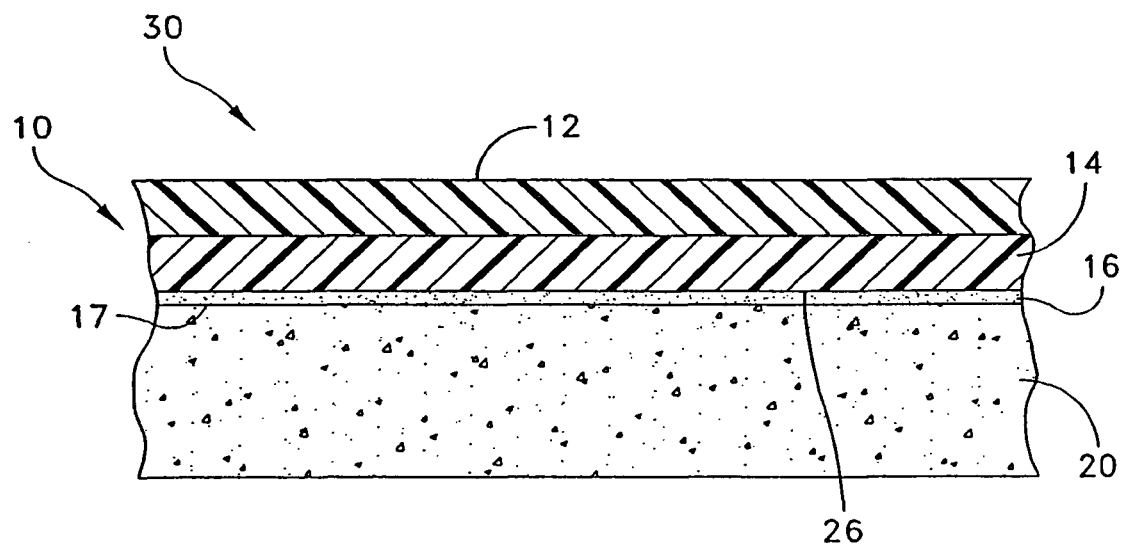
FIG. 2 is a diagrammatic sectional view of one form of a portion of a waterproofed roof/wall structure illustrative of a further embodiment of the invention.

Referring to FIG. 1, it will be seen that the illustrative waterproofing membrane 10 includes an outer surface layer 12 of thermoplastic waterproof material, such as vinyl or polyolefin, bonded to a cellular foam backing layer 14 coated with a pressure sensitive adhesive 16. The bonding of the backing layer 14 to the surface layer 12 may be accomplished by adhesive adhering, laminating, extrusion coating, heat sealing, gluing or taping, or the like. A manually removable release liner 18 is mounted on an undersurface 17 of the pressure sensitive adhesive 16 prior to application of the membrane 10 to a roof/wall structure 20 (FIG. 2).

The total composite membrane 10 may be about 120-140 mils or greater, in thickness, including the outer surface layer of waterproof material 12, which may be about 60 mils or greater, in thickness and the foam backing layer 14, which may be also about 60 mils, or greater, in thickness, Alternatively, the layer 12 may be 0.015-0.080 inch in thickness, and the back layer 14 may be 0.015-0 0.375 inch in thickness, depending upon the particulars of a specific application or project.

The flexible foam backing layer 14 conforms around minor irregularities in the roof/wall structure 20. The pressure sensitive adhesive 16 provides a strong bond between the membrane 10 and the roof/wall structure 20, even in the presence of water and concrete alkalis.

The structure 20 typically is a green roof and for a plaza deck serving as a roof structure for a work space or habitat therebeneath. Because of the heavy loads associated with such applications, the structure 20 is most often structural concrete. The external environment for such roofs is generally at least damp and often subject to wetness, including pooling or ponding. The structure may also be a foundation wall or an earth sheltered structure or tunnel. The membrane 10 accordingly is designed to protect the structure 20 from the effects of water infiltration, which can lead to structural deterioration and interior water damage.

In one embodiment, the outer surface layer 12 is a thermoplastic flexible sheet, made of vinyl or polyolefin, most commonly with an integral reinforcing material, such as glass fiber, polyester, nylon, or similar material. The backing layer 14 preferably is a cellular foam, such as a non-absorptive closed cell foam. The backing layer 14 is provided with the pressure sensitive adhesive 16 which is factory-applied and protected by the release liner 18 which is removed during application. The laminar membrane 10 has been found to substantially increase puncture resistance, compared to standard prior art membranes which do not include a backing layer.

Preferably, the surface layer 12 extends beyond a side edge 22 of the foam backing layer by about 2-4 inches to provide a selvedge 24. The membrane 10 is shown in width-wise cross section in FIGS. 1 and 2 and is typically provided in rolls which are 6.5-12.0 feet in width with, additionally, the 2-4 inch selvedge 24 on one side. In positioning the membrane 10 on the structure 20, the membrane sheets are disposed side-by-side with the foam backing layers 14 tightly abutting each other, and with the selvedge 24 overlapping the top of an adjoining membrane. The selvedge 24 is bonded, as by adhesives, glues, tapes, hot-air or solvent welding, to the overlapped membrane surface layer to provide bonded seams which will not deteriorate in the presence of water, moisture, roots, micro-organisms, and the like.

There is thus provided a waterproofing membrane which can be applied directly to concrete and other substances. The membrane finds particular application to green roof, plaza deck, planter, balcony and terrace substrates, foundation walls and tunnels, and is highly resistant to sub-grade environments of constant dampness, high alkalinity, exposure to plant roots, fungi, and bacterial organisms, as well as hydrostatic pressure, including ponded water conditions.

The membrane 10 is factory produced in its entirety. There is no assembly of the membrane at the work site; even the adhesive 16 by which the membrane 10 is applied to the structural substrate 20, is provided on the membrane and protected until the point of attachment by a the readily removable release liner 18.

The membrane 10 is made by providing the cellular foam backing, or cushion layer 14, of a selected length and width suitable for subsequent packaging in roll form. The layer of thermoplastic waterproof material 12 is bonded to a first side of the cushion layer 14. The layer of pressure sensitive adhesive 16 is deposited on a second side of the cushion layer 14, and the release liner 18 is mounted on the pressure sensitive adhesive 16 to completely cover the adhesive.

Preferably, the layer of thermoplastic waterproof material 12 extends beyond one side edge 22 of the cushion layer 14 to provide the aforementioned selvedge 24.

In the event of any incompatibility between the cushion material 14 and the pressure sensitive adhesive 16, a barrier film 26 may be interposed therebetween.

The assembled membrane components are then wound into roll form suitable for placing on a substrate and un-rolled on the substrate, while manually removing the release liner 18 to place the membrane 10, adhesive side down, on the surface of the substrate 20.

Upon application of the membrane 10 to the substrate 20, there is provided a roof/wall structure 30 (FIG. 2) including the substantially rigid substrate 20 and the waterproof membrane 10 adhesively bonded to an outer surface of the substrate, the membrane including the surface layer 12 of thermoplastic waterproof material, the layer 14 of cushion material bound to the surface layer 12, and the pressure sensitive adhesive 16 bound to a side of the cushion material 14 remote from the layer of thermoplastic waterproof material 12, and bound to the substrate 20.

The waterproof membrane surface layer 12 is in the form of an elongated strip which extends sideways outwardly from the side edge 22 of the layer 14 of cushion material to form the selvedge 24 (FIG. 1). The roof/wall structure includes a plurality of the strips of membrane 10 disposed on the substrate 20 lengthwise side-by-side with side edges 22 of their respective cushion portions 14 abutting each other, and the selvedge 24 of one elongated strip overlapping, and heat welded or otherwise adhered to, the surface layer 12 of another elongated strip of like structure.

The roof/wall structure thus formed is highly resistant to the aforementioned sub-grade environments.

There is further provided a method for waterproofing a structural surface. The method includes providing the waterproof membrane 10 for application to the surface, the membrane comprising the outer surface layer 12 of thermoplastic material, the layer of cushion material 14 bound to an inner surface of the layer of thermoplastic material, the pressure sensitive adhesive 16 bound to a side of the cushion material 14 remote from the surface layer 12 of thermoplastic material, and the release liner 18 removably mounted on the pressure sensitive adhesive 16.

The method includes the steps of removing the release liner 18 to expose the pressure sensitive adhesive 16, and pressing the pressure sensitive adhesive 16 against the structural surface to conform the layer of cushion material 14 to the structural surface 20 and bind the waterproofing membrane 10 to the structural surface.

The method for waterproofing the structural surface further comprises providing the layer 12 of thermoplastic material with a selvedge 24 comprising an extension of the outer layer of waterproof material 12 beyond a side edge 22 of the cellular foam cushion 14, preferably by about 2-4 inches. The selvedge 24 overlaps a neighboring strip of membrane, while the cushion portion 14 of the two strips are in abutting relationship. The selvedge is bound to the neighboring waterproof surface layer, as by heat-welding, adhesively, and the like.

Finally, there is provided a method for increasing puncture resistance of a thermoplastic membrane 10 for use in waterproofing of structural substrates 20, the method comprising bonding a layer of cushion material 14 to the thermoplastic layer 12, the cushion material 14 comprising a cellular foam material, the cushion material being adapted to conform around minor irregularities in a surface of the structural substrate 20.

There is thus provided a membrane for application to a surface of a structure to provide waterproof protection to the structure, a method for making such a membrane, a roof/wall structure including the membrane, a method for waterproofing a structured surface using the aforementioned membrane, and a method for providing increased puncture resistance to a thermoplastic membrane.

It will be understood that many additional changes in the details, materials, steps and arrangement of parts, which have been herein described and illustrated in order to explain the nature of the invention, may be made by those skilled in the art within the principles and scope of the invention as expressed in the appended claims.

For example, while the laminar structure described above is said to include a waterproof thermoplastic layer, and while such is regarded as a preferred embodiment, it will be apparent to those skilled in the art that a waterproof elastomeric material could also serve as a waterproof layer.

What is claimed is:

1. A method for waterproofing a structural surface, the method comprising the steps of:
   providing a waterproof composite membrane for adhesive application to an outer surface of the structural surface to substantially cover the surface, the composite membrane comprising;
   an outer surface layer of a selected one of thermoplastic and elastomeric waterproof material of about 60 mils thickness or greater;
   a backing layer of homogeneous non-absorptive closed-cell foam material of about 60 mils thickness or greater and constant cross-section bonded in continuous contact with an inner surface of said layer of thermoplastic or elastomeric material;
   the layer of foam material and the outer surface layer being bound to each other surface-to-surface so as to be devoid of a medium for lateral migration of water therethrough;
   a pressure sensitive adhesive contiguous with and bound to a side of said foam material remote from the outer surface layer;
   the layer of foam material being adapted to conform around irregularities in the structural surface;
   a release liner removably mounted on the pressure sensitive adhesive remote from the layer of foam material; and
   a 2-4 inch selvedge structure for overlapping and bonding of said waterproof material to an adjoining membrane;
   removing the release liner to expose the pressure sensitive adhesive;
   pressing the pressure sensitive adhesive against the structural surface; and
   overlapping the selvedge structure unto an adjoining membrane to conform the layer of foam material to the structural surface and bond the waterproof membrane to the structural surface;
   wherein the composite membrane provides waterproofing and moisture protection.

2. The method in accordance with claim 1, wherein the outer surface layer of thermoplastic or elastomeric material comprises at least in part a selected one of vinyl and polyolefin.

3. The method in accordance with claim 2, wherein the outer surface layer of thermoplastic or elastomeric material further comprises reinforcing comprising one of glass fiber and polyester.

4. The method in accordance with claim 1, wherein the outer surface layer is heat sealed to the layer of foam material.

5. The method in accordance with claim 1, wherein the waterproof membrane extends 2-4 inches on a side thereof beyond a side edge of adjoining foam material to form the selvedge structure; and comprising the further step of bonding the selvedge structure to a top edge portion of an abutting layer of waterproof material of a second waterproof membrane.

6. The method in accordance with claim 1, wherein the assembly comprising the layer of material, the waterproof material, the layer of pressure sensitive adhesive, the release liner, and the selvedge is assembled in rolls of about 6.5-12.0 feet in width with the selvedge extending a further 2-4 inches widthwise, a selected number of the rolls being transportable to a construction site and placed on a structure, the rolls being thereafter unrolled side-by-side, the release liner being removed from the adhesive, and strips of the assembly being laid down side-by-side with the selvedge of one strip overlaying an adjacent edge of a second strip.

7. The method in accordance with claim 1, wherein said pressure sensitive adhesive layer is provided with adhesive properties which remain in the presence of water and concrete alkalis.

8. The method in accordance with claim 1, wherein said release liner is manually removed from said pressure sensitive adhesive.

9. The method in accordance with claim 1, wherein said outer surface layer comprises at least in part a selected one of vinyl and polyolefin.

10. The membrane in accordance with claim 1, wherein said outer surface layer is bound to said layer of foam material by a selected one of adhesive adhering, laminating, extrusion coating, heat sealing, gluing, and taping.

11. The membrane in accordance with claim 1, wherein said pressure sensitive adhesive layer is manually attached to the surface of the structure by placement of the adhesive layer on the surface of the structure.

12. The membrane in accordance with claim 8, wherein said outer surface layer further comprises integral reinforcing material.

13. The membrane in accordance with claim 12, wherein said integral reinforcing material comprises a selected one of glass fiber, polyester, and nylon.

14. The membrane in accordance with claim 1, wherein said layer of foam material retains conforming properties in the presence of water and alkalis, and prevents lateral water migration.

15. The method in accordance with claim 1, wherein the outer surface layer is heat sealed to the layer of foam material.

* * * * *